United States Patent [19]

Sponseller

[11] 3,756,573
[45] Sept. 4, 1973

[54] ELASTIC MELT EXTRUDER AND METHOD OF OPERATION

[75] Inventor: Harold P. Sponseller, Toledo, Ohio

[73] Assignee: Owens-Illinois, Inc., Toledo, Ohio

[22] Filed: Nov. 19, 1971

[21] Appl. No.: 200,482

[52] U.S. Cl. .................................. 259/192, 259/105
[51] Int. Cl. .............................................. B01f 7/08
[58] Field of Search................... 259/191, 192, 193, 259/105, 9, 5, 6, 97; 425/376, 378, 379, 381, 381.2; 198/213

[56] References Cited
UNITED STATES PATENTS

| | | | |
|---|---|---|---|
| 2,948,922 | 8/1960 | Meskat | 259/105 |
| 2,982,990 | 5/1961 | Zomlefer | 259/105 |
| 3,371,379 | 3/1968 | Reifenhauser | 259/191 |

*Primary Examiner*—Robert W. Jenkins
*Attorney*—Edward J. Holler et al.

[57] ABSTRACT

An apparatus for the extrusion of plastic materials characterized by a short chamber combination screw and disk mechanism whereby the plastic material is rapidly changed from a granular to a completely masticated state. The incoming plastic material is received by a receiver screw mechanism that forces it over the surface of a disk plate where it is delivered to a centrally positioned screw for intermittent delivery through an extrusion orifice. The centrally located screw is axially aligned and coterminous with the outer screw mechanism, each screw being independently controlled.

4 Claims, 1 Drawing Figure

PATENTED SEP 4 1973
3,756,573
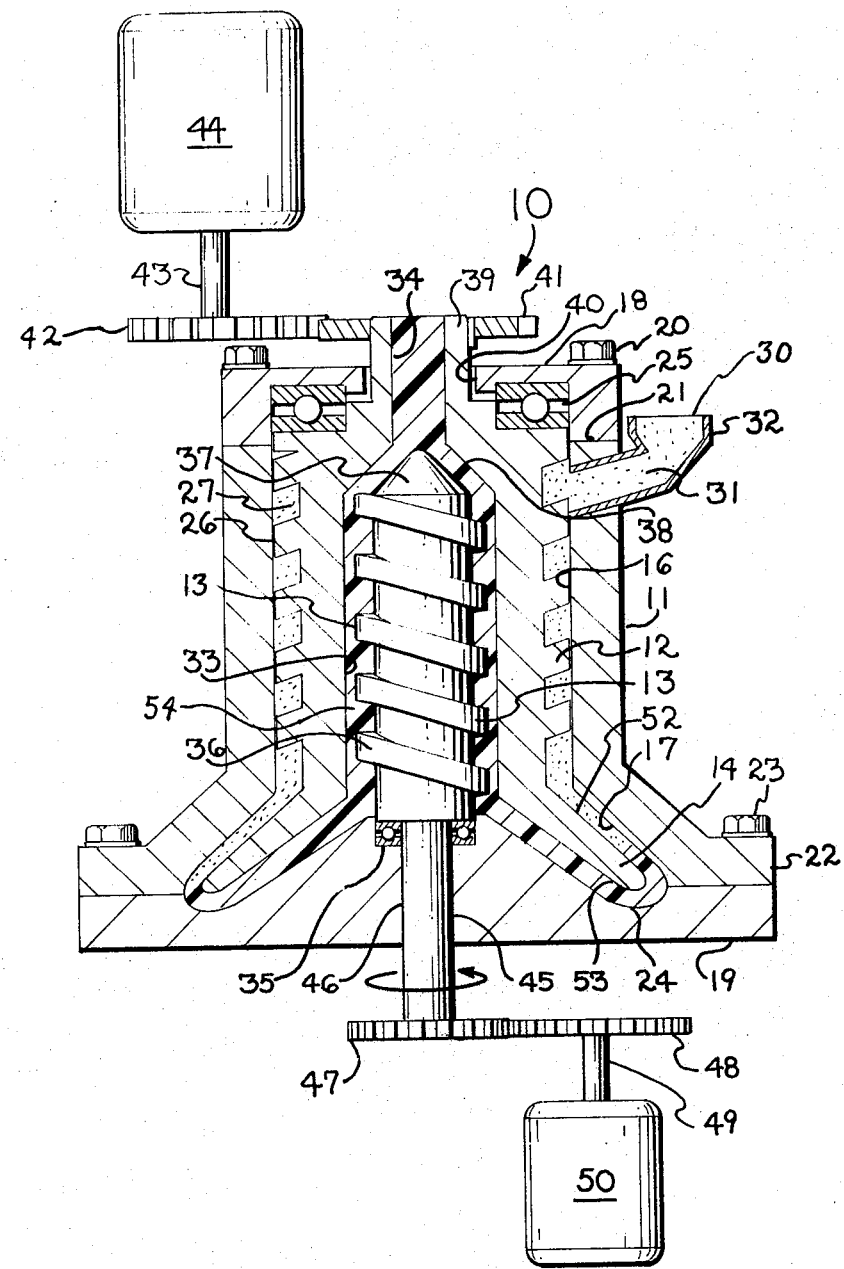
INVENTOR.
HAROLD P. SPONSELLE
BY D. R. Birchall
E. J. Holler
ATTORNEYS

ELASTIC MELT EXTRUDER AND METHOD OF OPERATION

The present invention relates to an elastic melt extruder and, more particularly, the invention relates to an extruder that has a very short overall length.

Elastic melt extruders in general accept a granular or partially granular material which is thoroughly homogenized by the shearing action of a rotatable blade or other mechanism against the plastic material.

Conventional elastic melt extruders have become more efficient than prior art devices and are capable of plastisizing large quantities of thermoplastic material such as polyvinyl chloride and the like. The greater efficiency of the present day elastic melt extruders has been attained in part because of an increase in the screw length to diameter ratio. With increases in the length to diameter ratio, (L/D), better melt homogeneity has resulted, also, lower melt temperatures have resulted along with a reduction in the so-called "dead" spaces which permitted material to accumulate and undergo degradation because of its slow rate of travel through the elastic melt extruder apparatus.

For a fuller discussion and description of elastic melt extruders in general, reference may be had to "Modern Plastics" magazine of Oct. 1959, at page 107, in an article by Bryce Maxwell and Anthony J. Scalora.

The present invention describes a new and novel means for extruding thoroughly plasticized material from an elastic melt extruder at efficiencies formerly attainable only by rather large screw L/D ratio devices. In the present invention, the overall length of the extruder apparatus is held to a minimum dimension. Further, the present invention also relates to a specific method for generating a thoroughly masticated plastic material and extruding said plastic material by means operating independently of the primarily elastic melt extruder.

Accordingly, the present invention comprises an outer screw mechanism confined within an annular chamber. Said outer screw mechanism coupled with a frusto-conical homogenizing disk that is located within the chamber that houses the outer screw mechanism. The outer screw mechanism contains, in axially alignment therewith and centrally located therein, an annular chamber for a second screw mechanism that operates independently with respect to said outer screw and homogenizing disk. The outer screw mechanism receives the unmixed material, propels it against the homogenizing disk, and forces it into the centrally located chamber thus permitting the inner screw mechanism to independently discharge the masticated material through an orifice upon demand.

It is therefore an important object of the present invention to provide a new and novel improved elastic melt extruder having a very short overall dimension. Another object of the present invention is the provision of a discharge screw mechanism that can operate independently of the remainder of the elastic melt extruder apparatus.

An additional object of the present invention is to provide a frusto-conical homogenizing disk that provides a large area for homogenizing the plastic material yet is confined to a minimum overall diameter.

A further, and no less important, object of the present invention is to provide a high pressure output of plastic material that has not undergone degradation caused by an undue dwell time within the elastic melt extrusion apparatus.

An object of the present invention is to provide a method of masticating plastic material at a uniform rate while providing for a non-uniform discharge rate.

Another object of the present invention is to realize increased output by mixing and storing the plastic material as required.

Another object of this invention is to provide a method and apparatus for preventing excess flow of plasticized material from the extrusion device.

Other objects of the present invention will be readily apparent by referring to the accompanying specification and drawing.

IN THE DRAWING

The drawing depicts a view shown part in section which illustrates an apparatus of the present invention. The apparatus shown in the drawing is one which is capable of carrying out the method herein disclosed.

Referring now to the drawing, the overall elastic melt extruder is shown and represented by numeral 10. An outer cylindrical shell or casing 11 contains therein a helical mixing screw mechanism 12 that coacts with the internal wall of the previously mentioned casing 11. Screw mechanism 12 contains a centrally positioned axially aligned bore which contains a smaller diameter feed screw 13 in axial alignment therewith.

Particulate plastic material is introduced into the helical chamber defined by the threads of the mixing screw mechanism 12. The plastic material is conveyed against and around a homogenizing disk 14. After thorough mastication has taken place, the plastic material is then conveyed and ejected from the overall apparatus 10 by feed screw 3. Thus it can be seen that particulate plastic material can be introduced to overall apparatus 10 and delivered therefrom in an orderly manner.

Referring to the drawing in greater detail, casing 11 is of annular configuration and contains a centrally located bore 16. Bore 16 is of cylindrical configuration for the greater extent of casing 11, however, at the innermost or bottom extent of the cylindrical portion of bore 16, the bore is expanded linearly in diameter to form a frusto-conical section 17.

The casing 11 forms part of the external housing of overall apparatus 10, the remainder of the enclosement is achieved by top plate 18 and bottom plate 19. The top plate 18 is attached to the uppermost end of casing 11 by bolts such as 20. The top plate 18 may be attached directly to the end wall 21 of casing 11 or may be attached to a flange (not shown) which would extend radially from end wall 21. In a similar manner, bottom plate 19 is attached to the lowermost extent of casing 11. The attachment of bottom plate 19 to flange 22 of casing 11 may be achieved by any convenient attachment means such as bolts 23.

The bottom plate 19 not only serves as an end closure for the overall apparatus 10, but it also serves to form a portion of the chamber through which the material is forced as it passes over the surface of homogenizing disk 14. A reentrant or cut out portion 24 is shown on the inside surface of bottom plate 19. The cut out portion 24 conicides with the extremity of homogenizing disk 14. The homogenizing disc 14 may be of constant thickness or else it can be of tapered configuration as shown in the drawing.

The top plate 18 also serves as a journaling mechanism for mixing screw mechanism 12. A thrust bearing 25 is held in position by top plate 18 by a press fit or other convenient means of assuring that outer race of bearing 25 is held in a generally immovable position. The mixing screw mechanism 12 then rides in part on thrust bearing 25 and in part against the internal surface of bore 16. A close tolerance fit between the external dimension of mixing screw mechanism 12 and the inside surface identified as bore 16 provides adequate stabilization for mixing screw mechanism 12 as it revolves about a centrally located axis. The exterior of mixing screw mechanism 12 contains a helically oriented thread 26 which progresses in an axial direction from the top to the bottom of mixing screw mechanism 12. Adequate space is provided in the throat 27 of thread 26 so that the particulate plastic material can be contained therein.

A feed ingress means 30 is positioned through the wall of casing 11. A chamber 31 communicates between infeed hopper 32 and the throat 27 of thread 26.

Mixing screw mechanism 12 contains an axially positioned cylindrical bore 33. Bore 33 is of constant diameter in the center portion of mixing screw mechanism 12. Bore 33 is constructed to a smaller diameter at the upper end thereof thus providing an out-put orifice 34. Feed screw 13 is positioned within cylindrical bore 33. Feed screw 13 is stabilized by close contact with cylindrical bore 33 and also by bearing 35 which is journaled in bottom plate 19. The external surface of feed screw 13 contains a helical thread 36 which is convoluted in a direction from the bottom to the top of feed screw 13. The top portion 37 of feed screw 13 is tapered to conform generally to the frusto-conical transitional surface 38 of cylindrical bore 33.

Returning now to mixing screw mechanism 12, a shaft 39 extends in an upward direction through a centrally located aperture 40 which is positioned in top plate 18. Gear 41 is affixed by any convenient means to the exterior end of shaft 39. Gear 41 meshes with drive gear 42 which in turn is fixedly mounted on drive shaft 43. Drive shaft 43, as shown in the drawing, is coupled directly with motor means 44.

Referring now to feed screw 13, it can be seen that feed screw 13 terminates at its bottom most extent with a shaft 45. Shaft 45 is journaled and confined by bearing 35 which not only accommodates the rotations of shaft 45, but also is capable of withstanding the thrust generated by feed screw 13 as it propels the homogenized plastic material in a direction toward the out put orifice 34. The lower end of shaft 45 extends through aperture 46 of bottom plate 19. A gear 47 or other equivalent drive means is attached to the lower end of shaft 45. A drive gear 48 is positioned in engagement with gear 47. Drive gear 48 is rotated by a combination drive shaft 49 and motor 50.

During the operation of the present invention, particulate plastic material is introduced to infeed hopper 32. The particulate material then passes through centrally positioned bore 31 until it is captured by throat 27 which is formed between the convolutions of thread 26. The annular rotation of mixing screw mechanism 12 moves the particulate material in a downward direction toward homogenizing disk 14. As the particulate material is forced against the exterior surface 52, of homogenizing disk 14, the material is heated and begins to coalesce. The mixing of the plastic material continues as the material is forced outwardly and downwardly along the exterior surface 52 of homogenizing disk 14. After the plastic material has reached the most radial extent and end of homogenizing disk 14, the material then passes through cut out portion 24 of bottom plate 19. The plastic material is then forced radially, inwardly and at the same time axially along the inner surface 53 of homogenizing disk 14. The thoroughly masticated plastic material is then delivered to throat 54 of feed screw 13. Throat 54 is, of course, positioned between the convolutions of threads 36 on feed screw 13.

The plastic material is at this time under the influence of feed screw 13 and upon demand feed screw 13 can be rotated thus further constricting and compacting the completely masticated material by forcing it into a further inwardly radial direction between tapered end 37 and frusto-conical transitional surface 38. The plastic material is then forced through out put orifice 34 to any conveniently located extrusion apparatus that would be utilized to convert the plastic material to a useful article of one type or another.

Thus, it becomes quite evident that the present invention is able to accomplish a thorough compacting and mixing of a particulate plastic material by elastic melt extrusion means all confined within a relatively short apparatus. It will be realized that apparatus of comparable ability are quite long, do require a lot of working space, and present expensive machine problems.

It will also be readily apparent that because of the independently driven screw mechanisms, plastic material can be ejected by out put orifice 34 in small quantities, large quantities, or intermittently, if desired. All this can be accomplished without necessarily changing the angular velocity of mixing screw mechanism 12. Then too, a slight reversal of the feed screw 13 can relieve the pressure buildup at the orifice thus preventing an ejection of unwanted plastic material from the extrusion device.

The present invention also contemplates a method wherein plastic material is introduced to an apparatus in particulate form and is thoroughly masticated by the apparatus and returned for discharging from the apparatus at a location not too distant from the location where the particulate material was first introduced to the apparatus. Thus, it is apparent from the description of the present apparatus that the plastic material not only reverses its direction of flow, but also can be fed intermittently from the apparatus.

The intermittent feed capability of the present invention is additionally important when the following new concept of the invention is fully realized. As has been pointed out supra, the incoming particulate material is advanced toward the homogenizing disc 14 by the action of thread 26. The force applied by the mixing screw mechanism 12 is sufficient to not only feed the particulate material to homogenizing disc 14, but to also cause the masticated material to flow in an upward direction away from the homogenizing disc 14 even though feed screw 13 is stationary. Thus it becomes evident that if feed screw 13 is stationary, there will be some flow of material from the orifice 34. If feed screw 13 is rotated in the direction shown in the drawing, the plastic material will be forced through orifice 34 under the combined force of feed screw 13 and mixing screw 12. If the direction of feed screw 13 is reversed from that shown in the drawing, the flow of material from orifice 34 can be diminished or stopped, if desired. The infinitely variable capability of the present invention thus becomes apparent.

From the above-discussion, it is evident that the present invention is defined in a manner not heretofore set forth by the prior art. Various modifications may be resorted to within the spirit of the invention and of the claims which are appended hereto.

What is claimed is:

1. An elastic melt extruder comprising a generally annular casing coupled to end closures to form a convolute chamber, a rotatable mixing screw, containing an axially aligned bore therein, positioned within a portion of said convolute chamber, said mixing screw having first and second ends, a material ingress orifice positioned at the first end of said mixing screw, said orifice in communication with feed hopper means and the space between said casing and mixing screw, a frusto-conical homogenizing disc attached to the second end of said mixing screw, a rotatable feed screw with threads of opposite pitch to the threads of said mixing screw in axial alignment with and positioned within the confinement of said mixing screw, a material egress orifice in axial alignment with said feed screw and positioned at the end of said feed screw, said egress orifice positioned adjacent the first end of said mixing screw, and independent motor means coupled respectively to said screws to rotate them at different rotational speeds.

2. An elastic melt extruder comprising an annular casing coupled to end closures to form a variable diameter convolute chamber, a mixing screw, containing an axially aligned bore therein, positioned within a cylindrical portion of said convolute chamber, said mixing screw having first and second ends, a material inlet orifice passing through said casing and positioned at the first end of said mixing screw, said orifice in communication with an open ended feed hopper and the space between the convolutions of the threads on said mixing screw, a variable thickness frusto-conical homogenizing disc of greater radial extent than the cylindrical portion of said convolute chamber attached to the second end of said mixing screw and occupying at least a portion of said convolute chamber, a feed screw with threads of opposite pitch to the threads of said mixing screw positioned in axial alignment with said mixing screw and contained within the axially aligned bore within said mixing screw, a material discharge orifice that is an extension of the bore within said mixing screw in axial alignment with said feed screw and positioned at the end of said feed screw, said discharge orifice positioned adjacent the first end of said mixing screw, and independent motor means coupled directly to said respective screws to rotate them at different rotational speeds.

3. An elastic melt extruder as claimed in claim 2 wherein one of said end closures forms a portion of the chamber that houses said homogenizing disc.

4. An elastic melt extruder comprising an annular casing coupled to end closures to form a variable diameter convolute chamber, a rotatable mixing screw, containing an axially aligned bore therein, said bore comprising a frusto-conical section positioned adjacent the second end of said mixing screw, a cylindrical section positioned within the central region of said mixing screw and reduced diameter section, adjacent said first end, that defines said discharge orifice, said mixing screw positioned within a cylindrical portion of said convolute chamber and having first and second ends, a material inlet orifice passing through said casing and positioned at the first end of said mixing screw, said orifice in communication with an open ended feed hopper and the space between the convolutions of the threads on said mixing screw, a variable thick-ness frusto-conical homogenizing disc attached to the second end of said mixing screw and occupying at least a portion of said convolute chamber, a rotatable feed screw positioned in axial alignment with said mixing screw and contained within the axially aligned bore within said mixing screw, a material discharge orifice in axial alignment with said feed screw and positioned at the end of said feed screw, said discharge orifice positioned adjacent the first end of said mixing screw, and independent motor means coupled directly to said respective screws to rotate them at different rotational speeds.

* * * * *